United States Patent [19]

Yodoshi

[11] 4,227,837
[45] Oct. 14, 1980

[54] ROUTER BIT

[76] Inventor: Shigeyasu Yodoshi, 6-22, Sakaemachi, Kawachinagano-shi, Osaka-fu, Japan

[21] Appl. No.: 950,619

[22] Filed: Oct. 12, 1978

[30] Foreign Application Priority Data

Mar. 9, 1978 [JP] Japan .................................. 53-27207

[51] Int. Cl.$^2$ .............................................. B26D 1/12
[52] U.S. Cl. ........................................ 407/53; 407/63
[58] Field of Search ...................... 407/53, 54, 55, 56, 407/57, 58, 59, 60, 61, 62, 63

[56] References Cited

U.S. PATENT DOCUMENTS

| 451,118 | 4/1891 | Evans | 407/63 |
| 1,713,273 | 5/1929 | Farrington | 407/61 |
| 1,890,452 | 12/1932 | Benninghoff | 407/55 |
| 1,898,732 | 2/1933 | Krohne | 407/55 |
| 2,344,954 | 3/1944 | Aber | 407/62 |
| 3,409,965 | 11/1968 | Fisher | 407/63 |

Primary Examiner—Harrison L. Hinson

[57] ABSTRACT

A router bit is provided with an even number of paired cutting edges. Each pair of cutting edges has opposite helix hands at the same helix angle with respect to the axis of rotation and a portion where the pitch of the cutting edge is constant when the cutting edge is developed along the circumference of rotation in the longitudinal direction. Such router bit is suitable for chamfering and finishing the side of board containing fiber reinforced plastics.

6 Claims, 14 Drawing Figures

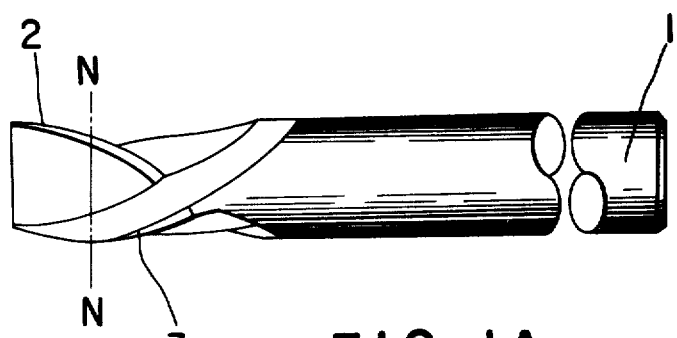
FIG. 1
FIG. 1A
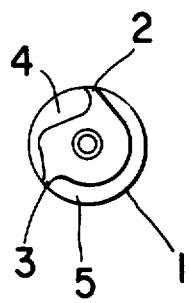
FIG. 2
FIG. 3
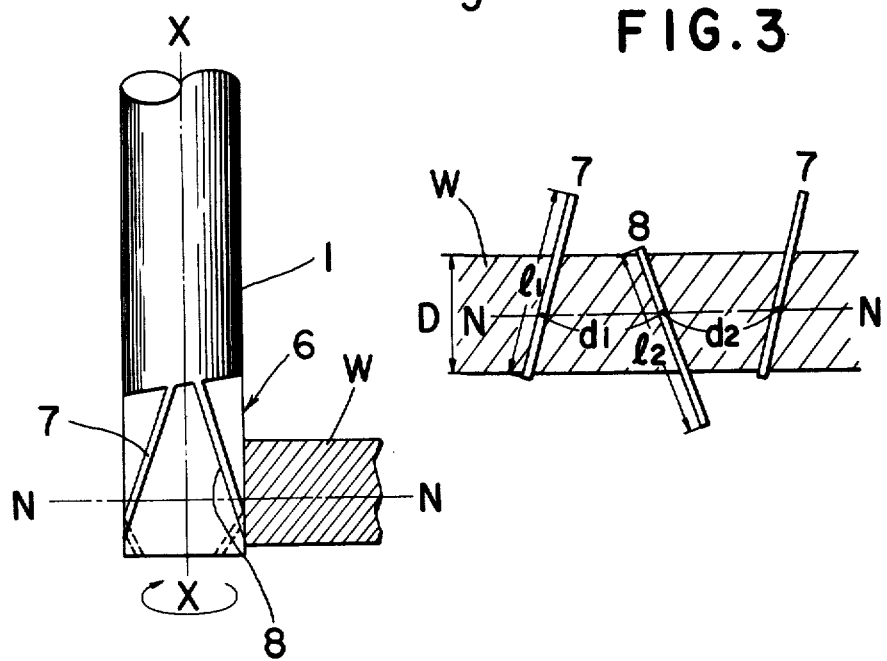

1

ROUTER BIT

BACKGROUND OF THE INVENTION

The present invention relates to a router bit. A router bit used for chamfering and finishing the butt end and side of a board is available in two types, i.e. a straight tooth type and a helical tooth type. Usually, a router bit of the helical tooth type is provided with an even number of cutting edges having helix angles in the same hand or direction with respect to the axis of rotation of the cutting edges. The conventional router bit of this type is liable to form burrs at the side of board when a board material containing fiber reinforced plastics is chamfered or finished. This is true particularly in chamfering or finishing FRP board or FRP-clad board in which fluffy fibers remain on the finished surface because the fibers are much stronger than the matrix resin. Such rough finish brings about delamination, corrosion, a decrease of strength, and breakage. This is quite different from problems involved in chamfering or finishing metal materials.

The object of the present invention is to eliminate the drawbacks of conventional technology as mentioned above, and is the result of observation of mutual actions of cutting edges and the material being cut.

SUMMARY OF THE INVENTION

It is the object of this invention to provide a router bit which is used for chamfering or finishing the side of a board containing fiber reinforced plastics.

This invention is directed to a router bit provided with an even number of paired cutting edges, each pair of cutting edges being in the form of helixes extending in opposite hands or directions at the same helix angle with respect to the axis of rotation, and a part where the pitch of the cutting edge is constant when the cutting edge is developed along the circumference of rotation in the longitudinal direction.

BREIF DESCRIPTION OF THE DRAWINGS

FIG. 1 is a front view of the router bit of Example 1 according to this invention, and FIG. 1A is a side elevation of the router bit of FIG. 1.

FIG. 2 is a schematic representation showing the relative position of the router bit and a workpiece.

FIG. 3 is an expansion plan of the cutting edges of FIG. 2 when the bit is moved relative to the edge of the workpiece.

Figure 8A:
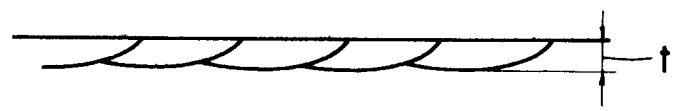
Figure 8B:
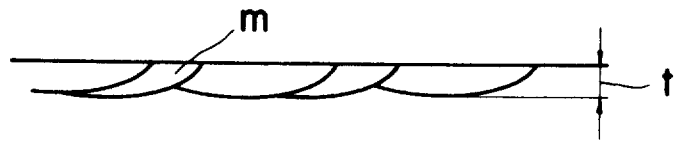
Figure 8C:
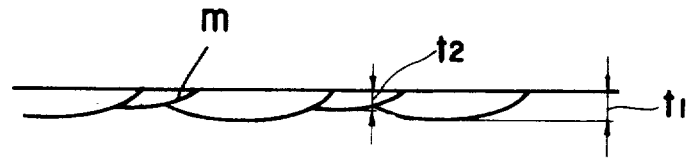

FIGS. 8A, 8B, and 8C are expansion plan views schematically illustrating how the cutting edge advances.

DETAILED DESCRIPTION OF THE INVENTION

The present invention will be described with reference to the following several examples.

EXAMPLE 1

FIG. 1 shows a double-edge router bit according to this invention. The forward end of the body (1) is provided with cutting edges (2) and (3) having helixes extending in opposite hands or directions. FIG. 1A is a view as seen from the forward end, and the flutes are indicated by (4) and (5). The cutting edges (2) and (3) have the same plus and minus helix angles with respect to the axis of rotation, and the precise helix angle is arbitrary. The cutting edges may be right hand cut or left hand cut. In this example, a pair of cutting edges are provided, but the number of cutting edges may be two, four, six, or any other even number.

FIG. 2 shows the relative position of the router bit and the work in chamfering the side of board (W) with the router bit according to this invention. The cutting edges (7) and (8) are provided at the same intervals $d_1 = d_2$ as shown in FIG. 3 which is an expansion plan in which a reference line N—N is assumed near the center of the length of the cutting edges. Since the direction or hand of cut of the edges is different from each other, the pitch of the cutting edges become varied as they become spaced from the reference line N—N. Thus, the cutting edges (7) and (8) are arranged in such a manner that they overlap over the entire chamfering width when the reference line N—N coincides with the center of the board (D). As shown in FIG. 3, the right hand cutting edge and the left hand cutting edge are involved in cutting at all times within the thickness (D) of board to be chamfered.

When a router bit of this structure is used for chamfering at a high speed a board containing FRP, the entire side of the board is chamfered by the right hand cutting edge and left hand cutting edge and the fibers exposed to the side of the board are cut in two directions with uniform cutting force. This results in a smooth finish with no burrs and fluffy fibers.

If cutting edges of different length in the lengthwise direction are provided, the bit should be positioned so that the reference line N—N coincides with the center of the board according to the board to be fabricated. This is not practical. Therefore, in this invention, the cutting edges are the same in length in the lengthwise direction as shown in FIG. 3. ($l_1 = l_2 = \ldots$), and are spaced at equal intervals in the circumferential direction on the reference line N—N at the center of each cutting edge.

FIGS. 8A, 8B and 8C show schematically the movement of the two cutting edges according to the Examples. FIG. 8A illustrates a cut of width t made by the cutting edges on the reference line N—N, in which cutting edges are arranged on a cylinder. In this case the pitch in the circumferential direction is uniform, and the cutting edges advance at equal intervals. FIG. 8B shows schematically how the two cutting edges according to the Example advance when cutting is accomplished by the cutting edges being spaced from the reference line N—N. In this case the cutting edges advance at different pitches.

When the side of an FRP board is finished with a double-edge router bit 6.35 mm in diameter made of high speed steel according to this invention at 1500 to 3000 rpm, no burrs nor fluffy fibers were observed on the side of the FRP board.

EXAMPLE 2

Figure 4:
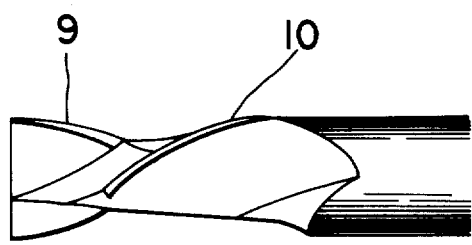
FIG. 4 is a front view of the router bit of Example 2 acccording to this invention.
Figure 4A:
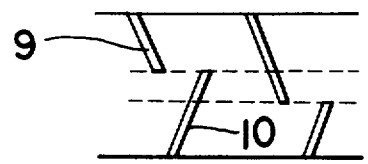
FIG. 4A is an expansion plan of the router bit of FIG. 4.

FIG. 4 shows another example of a router bit according to this invention. In this example, two cutting edges are provided in such a manner that one cutting edge crosses the other cutting edge of opposite helix angle, and the crossing cutting edges divide each other. FIG. 4A is an expansion plan of the two cutting edges. In this example, the cutting edges are arranged in such a manner that the number of cutting edges are the same within a section perpendicular to the axis at an arbitary position along the effective length of the cutting edge.

EXAMPLE 3

Figure 5:
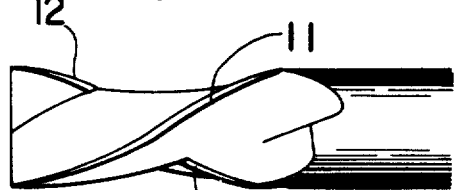
FIG. 5 is a front view of the router bit of Example 3 according to this invention.
Figure 5A:
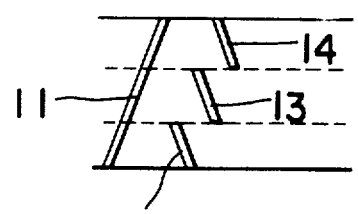
FIG. 5A is an expansion plan of the router bit of FIG. 5.

FIG. 5 shows a router bit having a long cutting edge (11) and plural short cutting edges (12), (13), and (14) in opposite helix angle, the long cutting edge (11) dividing the short cutting edges (12), (13), and (14). FIG. 5A is an expansion plan of this router bit. According to this embodiment of the invention, the short cutting edge (13) may be omitted so long as the short cutting edges (12) and (14) are placed on the side of a board to be chamfered.

EXAMPLE 4

Figure 6:
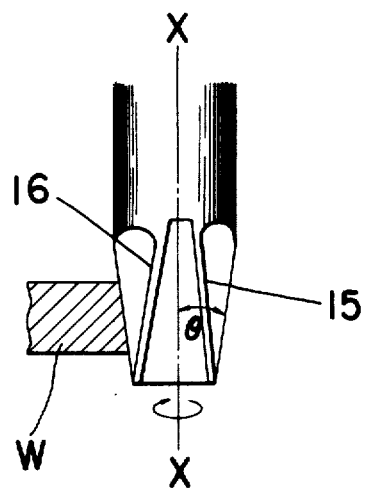
FIG. 6 is a front view of the router bit of Example 4 according to this invention.

FIG. 6 shows another example of a router bit according to this invention. In this example the cutting edges (15) and (16) have a taper angle $\theta$ with respect to the direction of the axis X—X. The helix angle of a rotary cutting tool is expressed by the angle formed by the axis of rotation and the tangent of cutting edges on the rotating cylindrical surface. In the case of a tapered cutting edge, the helix angle varies from one place to another if manufactured by the ordinary process in which the lead is kept constant, because the diameter varies along the cutting edge. However, the right hand cutting edge and left hand cutting edge have the same angles at an arbitrary position on a plane perpendicular to the axis. The taper angle $\theta$ should be within 10° for practical use.

EXAMPLE 5

Figures 7, 7A:
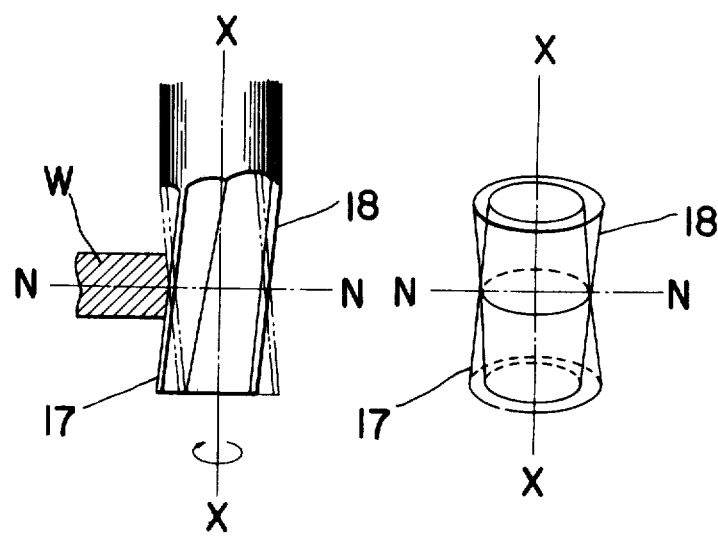
FIG. 7 is a front view of the router bit of Example 5 according to this invention.
FIG. 7A is a perspective view explaining the structure of the router bit shown in FIG. 7.

FIG. 7 shows another example of a router bit according to this invention. In this example, the right hand cutting edge (17) is tapered toward the shank and the left hand cutting edge (18) is tapered toward the end. Both cutting edges are spaced equally from the center of the axis on the reference line. In this case, too, as in Example 4, the cutting edges have tapered angles, but there is no problem so long as the helix angles and the lead are constant. FIG. 7A shows a locus of the cutting edges given by rotating the router bit. This example is characterized by the fact that the taper angle is such that the cutting edges having the right hand and left hand helix angles are within a range of cutting over the entire thickness of the work. In the case of a router bit with tapered cutting edges of opposite helix angles, only cutting edges of the same helix angle are involved in cutting depending on the taper angle and cutting condition, and under such a condition the performance is decreased by half as compared with that of this example. For operation with a router bit of this example, adjustment should be made so that the center of the work coincides with the reference line.

FIG. 8C shows schematically how the cutting edges of a router bit according to Example 5 advance when cutting is acomplished by the cutting edges out of the reference line N—N. In this case the cutting edges advance at different pitches and the depth of cut varies from $t_1$ to $t_2$ in accordance with the taper angle. Under some cutting conditions, small cut tips (m) may disappear, and the taper is selected in this invention so that small tips (m) do not disappear.

When a printed circuit board of glass cloth-epoxy laminate was chamfered with a double-edge router bit 9.525 mm ($\frac{3}{8}$") in diameter of this invention at 1500 rpm, defective burrs and fluffy fibers did not appear on the side of the board.

The router bit of this invention having cutting edges of opposite helix angles is similar to a staggered tooth side milling cutter, which is used principally for the rough cutting of metal, but is quite different therefrom in the shape and arrangement of cutting edges and the applications.

The structure other than the cutting edges and the materials can be selected arbitrarily according to this invention.

What is claimed is:

1. A router tool for use in chamfering or finishing a side or edge of a board, particularly a fiber reinforced plastic board, said router tool comprising:
   an elongated body having a longitudinal rotational axis, a periphery, a free end and a shank end;
   an even number of paired cutting edges formed in said periphery of said body adjacent said free end thereof;
   said cutting edges of each said pair of cutting edges extending helically in opposite directions but at equal helical angles with respect to said rotational axis; and
   said cutting edges being positioned such that when they are developed along a direction circumferentially of said body about said rotational axis, thus developed cutting edges of opposite helix at least partially overlap each other in said direction and are spaced at an area in said direction by a constant pitch, said area forming a cutting zone for use in chamfering or finishing a side or edge of a board.

2. A router tool as claimed in claim 1, wherein said cutting edges of each said pair of cutting edges are disposed such that they do not cross each other.

3. A router tool as claimed in claim 1, wherein a continuous first said cutting edge of each said pair of cutting edges crosses a second cutting edge of each said pair of cutting edges, thereby dividing said second cutting edge into plural cutting edge sections.

4. A router tool as claimed in claim 1, wherein said cutting edges of each pair of cutting edges are disposed to cross each other, thereby dividing each other into plural cutting edge sections.

5. A router tool as claimed in claim 1, wherein each said cutting edge is disposed at a tapered angle with respect to said rotational axis.

6. A router tool for use in chamfering or finishing a side or edge of a board, particularly a fiber reinforced plastic board, said router tool comprising:
   an elongated body having a longitudinal rotational axis, a periphery, a free end and a shank end;
   an even number of paired cutting edges formed in said periphery of said body adjacent said free end thereof;
   said cutting edges of each said pair of cutting edges extending helically in opposite directions with respect to said rotational axis;

a first said cutting edge of each said pair of cutting edges being disposed along an imaginary surface of a first circular cone having a base extending toward said free end and an apex extending toward said shank end;

a second said cutting edge of each said pair of cutting edges being disposed along an imaginary surface of a second circular cone having a base extending toward said shank end and an apex extending toward said free end; and said imaginary surfaces of said first and second cones intersecting at an area extending in a direction circumferentially of said body whereat said cutting edges are spaced in said direction by a constant pitch, said area forming a cutting zone for use in chamfering or finishing a side or edge of a board.

* * * * *